US006333575B1

(12) United States Patent

Bank et al.

(10) Patent No.: US 6,333,575 B1
(45) Date of Patent: *Dec. 25, 2001

(54) VIBRATION EXCITER

(75) Inventors: Graham Bank, Suffolk; Martin Colloms, London, both of (GB)

(73) Assignee: New Transducers Limited, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/518,820

(22) Filed: Mar. 3, 2000

Related U.S. Application Data

(63) Continuation of application No. PCT/GB98/02537, filed on Aug. 24, 1998.

(30) Foreign Application Priority Data

Sep. 6, 1997 (GB) ........................ 9718878

(51) Int. Cl.[7] ........................ H02K 7/06
(52) U.S. Cl. ........................ 310/81; 310/51
(58) Field of Search ........................ 310/81, 15, 51, 310/16, 17, 32, 29

(56) References Cited

U.S. PATENT DOCUMENTS

| | | | | |
|---|---|---|---|---|
| 4,680,492 | | 7/1987 | Tamura | 310/15 |
| 5,602,432 | * | 2/1997 | Mizutani | 310/15 |

FOREIGN PATENT DOCUMENTS

| | | |
|---|---|---|
| 0 517 497 | 12/1992 | (EP) . |
| 0 722 260 | 7/1996 | (EP) . |
| WO 97/09859 | 3/1997 | (WO) . |

* cited by examiner

*Primary Examiner*—Nestor Ramirez
*Assistant Examiner*—Thanh Lam
(74) *Attorney, Agent, or Firm*—Foley & Lardner

(57) ABSTRACT

A vibration exciter adapted for location in a cavity in a member to be vibrated. A motor coil assembly (6) has a coil rigidly fixed to a tubular member, the motor coil assembly having an outer peripheral face, and a magnet assembly (3–5) is disposed concentrically of the motor coil assembly and arranged for axial movement relative thereto. The magnet assembly has opposed generally disc-like pole pieces (4, 5), the periphery of one of which is disposed within and adjacent to the motor coil assembly, and the periphery of the other (5) of which pole pieces is formed with a flange (8) arranged to lie adjacent to and to surround the motor coil assembly. The flange has aperture portions (11) through which the outer peripheral face of motor coil assembly is adapted to be fixed directly to the cavity wall in the member to be vibrated.

19 Claims, 3 Drawing Sheets

VIBRATION EXCITER

This application is a continuation of International application No. PCT/GB98/02537, filed Aug. 24, 1998.

TECHNICAL FIELD

The invention relates to a vibration exciter and more particularly, but not exclusively, to an inertial electrodynamic vibration exciter for exciting bending waves in a resonant panel to provide an acoustic output. Such devices are the subject of our co-pending International patent application WO97/09859.

BACKGROUND ART

One previous design for a balanced vibration exciter suitable for embedding within an acoustic panel radiator uses a pair of disc magnets coupled with poles opposing via a plate of magnetically permeable material such as mild steel. The result is a strong radial field enveloped around the plate which acts on a coil coupled to the radiating element. Of balanced design this exciter may be embedded symmetrically within the panel radiator and the coupling may be arranged so that both sides of the panel are equally coupled.

Alternatively, it is known to employ a cup type of exciter placed on one side or skin of the acoustic panel and this relies on good mechanical coupling through the panel to ensure equal or near equal acoustic output from both sides of the panel.

Two difficulties arise with the radial field type of exciter in specific applications. If high acoustic power is required the electrical input must be raised. This brings consideration of the thermal power in the exciter coil and the means for safely dissipating the excess heat.

Some gain in thermal dissipation can be achieved by using a thermally conductive carrier for the coil, coupled to global, or locally thermally conductive skins. Thus the heat within the panel is conducted outside and is radiated away.

DISCLOSURE OF INVENTION

According to the invention there is provided a vibration transducer adapted for location at least partially in a cavity in a member to be vibrated, comprising a motor coil assembly having a coil rigidly fixed to a tubular member, the motor coil assembly having an outer peripheral face, a magnet assembly disposed concentrically of the motor coil assembly and arranged for axial movement relative thereto, the magnet assembly having opposed generally disc-like pole pieces, the periphery of one of which is disposed within and adjacent to the motor coil assembly, and the periphery of the other of which pole pieces is formed with a flange arranged to lie adjacent to and to surround the motor coil assembly, the flange having aperture portions through which the outer peripheral face of motor coil assembly can be fixed directly to the member to be vibrated. The aperture portions thus form "windows" in the flange of the said other pole piece through which the motor coil assembly can be fixed to the member to be vibrated. The aperture portions may be created by forming the flange with cut-away portions or slots. The exciter may be an inertial device. The member to be vibrated may be panel-form.

Resilient means may be provided for supporting the magnet assembly for axial movement relative to the motor coil assembly. The resilient suspension may be adapted for fixing to the member to be vibrated. The resilient suspension may be mounted on the said other pole piece.

From another aspect the invention is a loudspeaker comprising a vibration transducer as described above.

From yet another aspect the invention is an assembly comprising a vibration exciter as described above and a resilient panel member in which the exciter is mounted.

There may be any number of aperture portions, i.e. two or more, to provide versatile options for coupling of the coil to the panel, for example to optimise the matching of the relative mechanical impedances for control of the frequency response of the assembly. The inertial mass represented by the magnet assembly is compliantly fixed to the panel or an intermediate carrier or frame such that good centering is maintained between the coil and the defined magnetic gap. Many suspension constructions are possible including an annular corrugated suspension, or small foam rubber pads.

BRIEF DESCRIPTION OF DRAWINGS

The invention is diagrammatically illustrated, by way of example, in the accompanying drawings, in which.

BEST MODES FOR CARRYING OUT THE INVENTION

Figure 3:
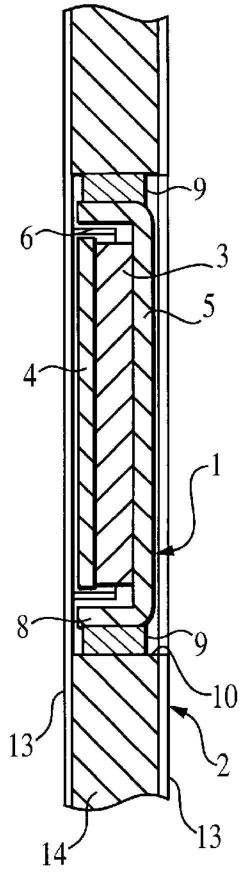
FIG. 3 is a cross-section taken on line 3—3 of FIG. 1.
Figure 1:
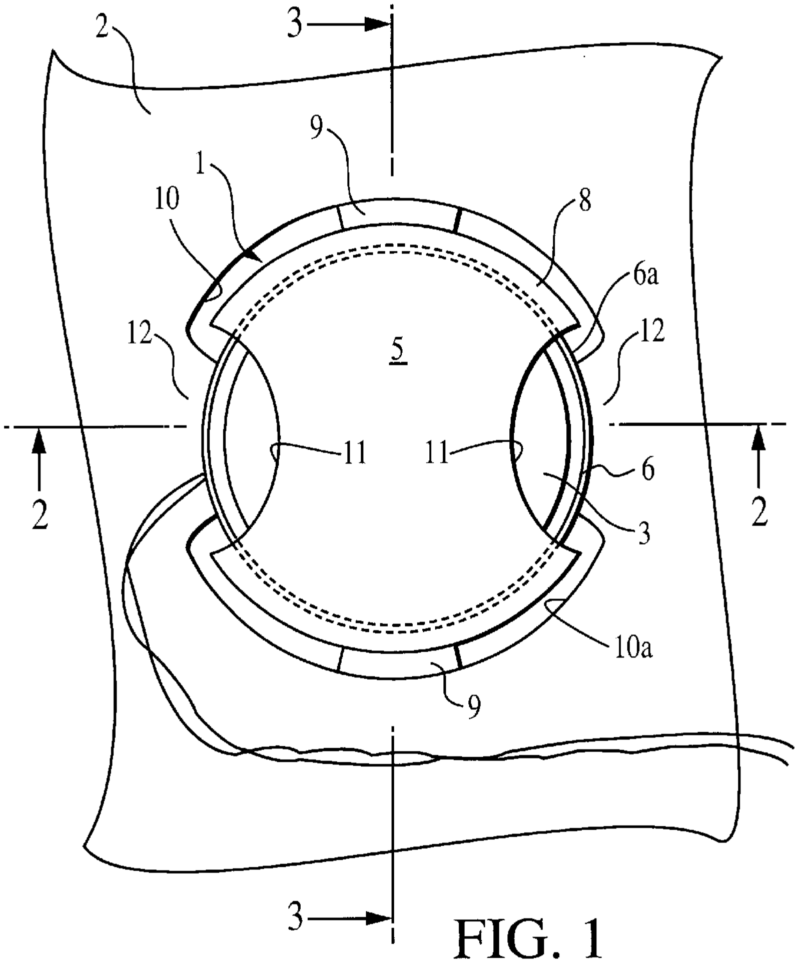
FIG. 1 is a plan view of one embodiment of a vibration exciter according to the invention mounted in a resonant acoustic radiator panel.
Figure 2:
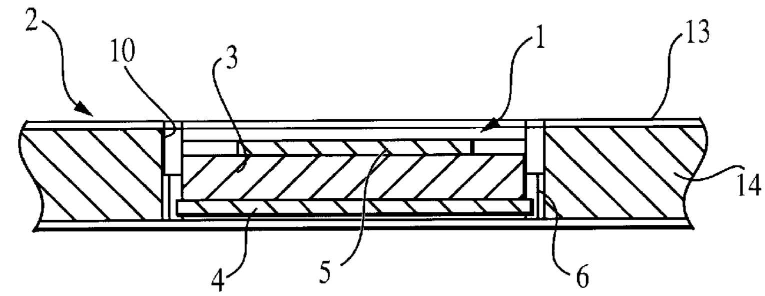
FIG. 2 is a cross-section taken on line 2—2 of FIG. 1.

In FIGS. 1 to 3 of the drawings, there is shown an inertial vibration exciter 1 adapted to launch bending waves into a rigid lightweight resonant radiator panel 2 to cause the panel to resonate. This exciter is described in FIGS. 5*b* and 5*c* of our co-pending International patent application WO97/09859, the differences being described below.

The exciter of FIG. 5*b* of International patent application No. WO97/09859 comprises a coil fixed, e.g. by means of an adhesive, on the outside of a coil former member to form a motor coil assembly one axial end of which is rigidly bonded to the surface skin of the radiator panel, e.g. by means of an epoxy adhesive bond. A magnet is enclosed by a pair of poles, one of which is disc-like and is disposed with its periphery close to the interior of each coil former, and the other of which has a peripheral flange arranged to surround the coil. The magnet assembly is secured to the surface of the panel by means of a resilient suspension e.g. of rubber, which is attached to the periphery of the flange of the outer pole pieces. Thus the exciter works to launch bending waves into the panel by inertial effects due to the mass of the magnet assembly.

FIG. 5*c* of International patent application No. WO97/09859 shows an exciter of the kind shown in FIG. 5*b* and is intended for easy application to a panel surface. Thus the exciter is mounted, by way of an axial end of the former and resilient suspension on a thin substrate formed with a self-adhesive outer layer whereby the transducer can be mounted in position on a panel to be vibrated.

In the present case the exciter 1 of FIGS. 1 to 3 comprises a motor coil assembly 6 comprising a coil fixed, e.g. by means of an adhesive, on the outside of a coil former member. A magnet 3 is enclosed by a pair of poles 4,5, one of which is disc-like and is disposed with its periphery close to the interior of the coil 6 to form an inner pole piece 4, and the other of which is cup-like and has a peripheral flange 8 arranged to surround the coil 6 to form an outer pole piece 5. The magnet assembly 3,4,5 is secured to the panel 2 by means of a resilient suspension 9 e.g. of rubber, which is attached to the periphery of the flange 8 of the outer pole piece 5. Thus the exciter works to launch bending waves into the panel by inertial effects due to the mass of the magnet assembly.

The exciter 1 is intended to be embedded at least to some extent in a generally circular aperture (cavity) 10 in the panel 2 to be vibrated whereby the outer peripheral surface 6*a* of the coil 6 can be directly connected to the panel 2, e.g. over an area represented by the panel thickness, to provide a good mechanical interface therebetween. To enable this to occur, the cup-like outer pole piece 5 is formed with apertures or slots 11 in its flange 8 so that portions of the outer peripheral surface 6*a* of the coil 6 are exposed and can be directly coupled to the panel 2. As shown, the cup-like pole piece 5 is formed with an opposed pair of slots. The cavity wall 10*a* of generally circular aperture 10 is formed with opposed inwardly extending tabs or fingers 12 formed by the material of the panel 2 and which extend through the slots 11 in the pole piece 5 and engage the coil 6 so that they can be fixed together in surface to surface contact, e.g. by means of an adhesive. As shown, the panel 2 comprises opposed skins 13 sandwiching a core 14, and one skin extends to cover one end of the aperture 10 so that the exciter 1 is hidden in use.

Figure 4:
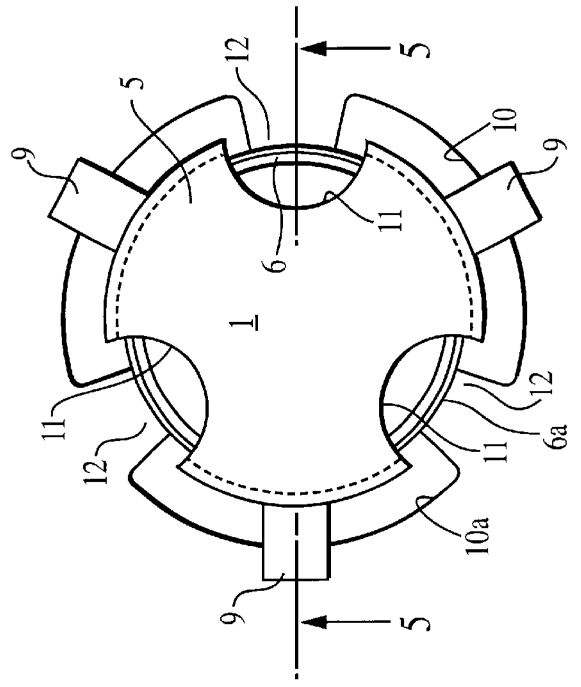
FIG. 4 is a plan view of a second embodiment of a vibration exciter according to the invention.
Figure 5:
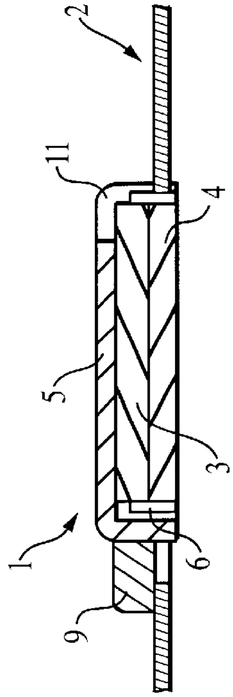
FIG. 5 is a cross-section taken on line 5—5 of FIG. 4.

The embodiment of vibration exciter 1 shown in FIGS. 4 and 5 is generally similar to that of FIGS. 1 to 3, the significant differences being that the panel 2 in this embodiment is relatively thin, e.g. a carbon-fibre reinforced monolith, and that the outer pole piece 5 is formed with three equi-spaced apertures or slots 11 to enable the coil 6 to be engaged by tabs 12 on the panel 2 at three positions around the periphery of the coil. Also due to the panel thinness, the resilient suspension members 9 for the magnet assembly 3,4,5 are mounted on one face of the panel 2.

Figure 6:
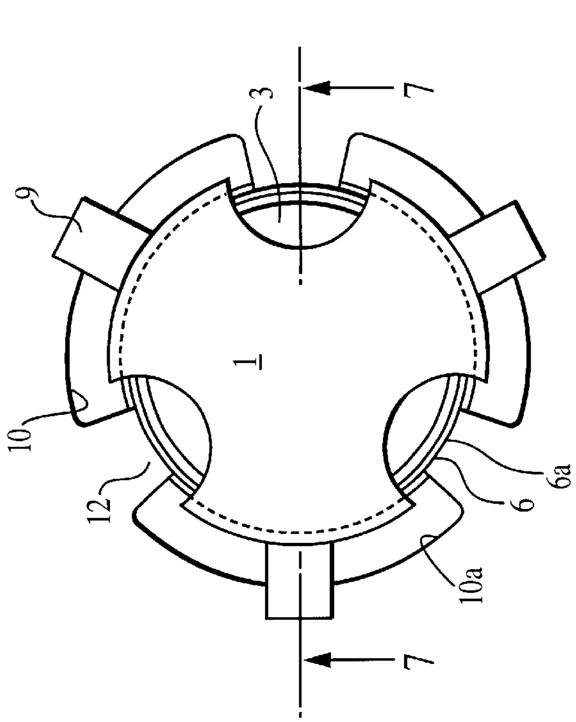
FIG. 6 is a plan view of a third embodiment of a vibration exciter according to the invention.
Figure 7:
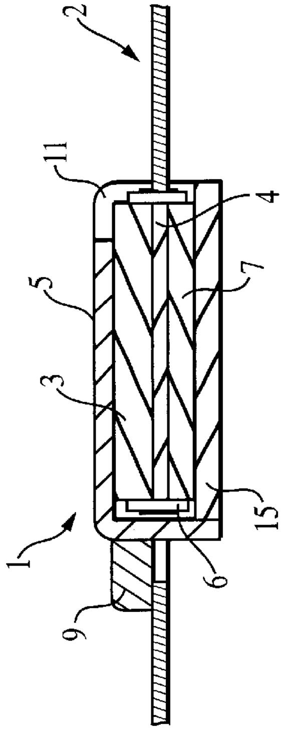
FIG. 7 is a cross-section taken on line 7—7 of FIG. 6.

The embodiment of vibration exciter shown in FIGS. 6 and 7 is generally similar to that of FIGS. 4 and 5, with the exception that the magnet assembly is a balanced device comprising a pair of magnets 3,7, sandwiched between respective outer pole pieces 5 and 15, the magnets being separated by an inner pole piece 4.

Figure 8:
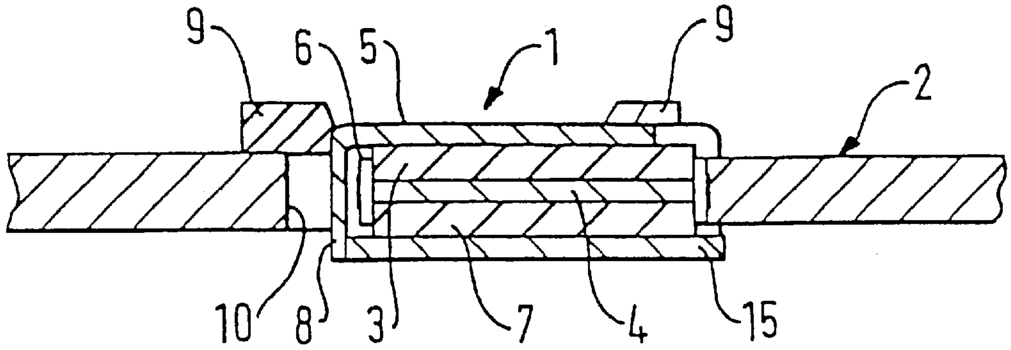
FIG. 8 is a cross-sectional view of an exciter similar to the embodiment of FIGS. 6 and 7 applied to a panel of greater thickness.

The vibration exciter 1 of FIG. 8 is generally similar to that of FIGS. 6 and 7 but is applied to a panel 2 of greater thickness than that of FIGS. 6 and 7. To accommodate this, the resilient suspension members 9 for the magnet assembly 3,4,5,7,15 are mounted at an edge of the flange 8 of the pole piece 5.

Figure 9:
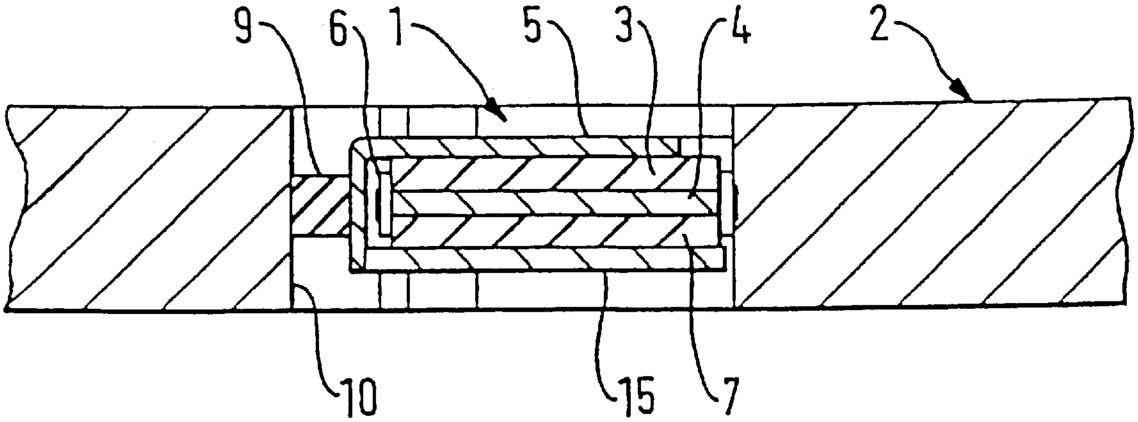
FIG. 9 is a cross-sectional view similar to FIG. 8 showing the exciter applied to a relatively thick panel.

The vibration exciter 1 of FIG. 9 is similar to that of FIG. 8 but is applied to a relatively thick panel 2 so that it is possible to accommodate the exciter 1 and the suspension members 9 entirely within the aperture 10 in the panel 2.

Refinements (not shown) may include blacking of the magnet cup to radiate heat, and/or the attachment of auxiliary heatsinks to either the cup and/or the coil assembly. For the latter the available access to sections of the coil presents an area for thermally coupling metal or mineral loaded heat conductive parts. The mechanical coupling must nevertheless be compliant to allow free coil motion. A ceramic loaded soft polymer is suitable, simultaneously providing good thermal conductivity. With appropriate design of the flux distribution to provide capture of magnetic fluid, a heat conductive fluid such as Ferrofluid may be used in the gap area to aid overall thermal coupling.

Industrial Applicability

Increased power capacity provides greater sound levels and/or a combination of acoustic performance parameters such as greater bandwidth or reduced cost by a reduction of the volume of expensive magnetic material employed. A further possible advantage is thinness where the embedding of the exciter within an acoustic panel enables an attractively thin overall assembly that may fit more easily in applications where thickness is an issue, e.g. laptop computers, portable equipment and for slim, wall mounted speaker applications.

The invention thus provides efficient vibration exciters which may be employed in loudspeakers of the resonant panel variety.

What is claimed is:

1. A vibration exciter adapted for location in a cavity in a member to be vibrated, the cavity having a cavity wall surrounding and spaced from an axis and to which a portion of the exciter can be mounted, the exciter comprising a motor coil assembly adapted to be aligned with the axis and having a coil rigidly fixed to a tubular member, the motor coil assembly having an outer peripheral face adapted to face the cavity wall, a magnet assembly disposed concentrically of the motor coil assembly and arranged for axial movement relative thereto, the magnet assembly having opposed generally disc-like pole pieces each having a periphery, the periphery of one of which pole pieces is disposed within and adjacent to the motor coil assembly, and the periphery of the other of which pole pieces is formed with a flange arranged to lie adjacent to and surround the motor coil assembly, the flange having apertures through which the outer peripheral face of the motor coil assembly is adapted to be fixed directly to the cavity wall in the member to be vibrated.

2. A vibration exciter according to claim 1, wherein the transducer is an inertial device.

3. A vibration exciter according to claim 1, further comprising a resilient suspension adapted to support the magnet assembly on the member to be vibrated for axial movement relative to the motor coil assembly.

4. A vibration exciter according to claim 3, wherein the resilient suspension is adapted for fixing to the member to be vibrated.

5. A vibration exciter according to claim 4, wherein the resilient suspension is mounted on the said other pole piece.

6. A vibration exciter according to claim 3, wherein the apertures in the flange are equi-spaced round the flange.

7. A vibration exciter according to claim 6, comprising three equi-spaced apertures in the flange.

8. A vibration exciter according to claim 1, wherein the apertures in the flange are equi-spaced round the flange.

9. A vibration exciter according to claim 8, comprising three equi-spaced apertures in the flange.

10. An acoustic assembly comprising:

a resonant panel member having a cavity with a cavity wall surrounding and spaced from an axis extending generally in the direction of panel member thickness; and a vibration exciter mounted in said cavity and comprising:

a motor coil assembly aligned with the axis and having a coil rigidly fixed to a tubular member, the motor coil assembly having an outer peripheral face facing said cavity wall; and a magnet assembly disposed concentrically of the motor coil assembly and arranged for axial movement relative thereto, the magnet assembly having opposed generally disc-like pole pieces each having a periphery, the periphery of one of which pole pieces is disposed within and adjacent to the motor coil assembly, and the periphery of the other of which pole pieces is formed with a flange arranged to lie adjacent to and to surround the motor coil assembly, the flange having apertures through which the outer peripheral face of the motor coil assembly is fixed directly to said cavity wall.

11. An acoustic assembly according to claim 10, adapted to operate as a loudspeaker.

12. An acoustic assembly according to claim 10, wherein the panel member comprises a core sandwiched between two skins, at least one of the skins extending across the cavity to conceal the exciter.

13. An acoustic assembly according to claim 12, wherein the panel member is at least as thick as the exciter, and the exciter is accommodated entirely within the cavity.

14. An acoustic assembly according to claim 10, wherein the panel member is at least as thick as the exciter, and the exciter is accommodated entirely within the cavity.

15. An acoustic assembly according to claim 10, wherein the panel member is thinner than the exciter.

16. An acoustic assembly according to claim 15, wherein the panel member comprises a fiber-reinforced monolith.

17. An acoustic assembly according to claim 10, further comprising a resilient suspension for the exciter interconnecting said other pole piece and the panel member.

18. An acoustic assembly according to claim 10, wherein the apertures in the flange are equi-spaced round the flange.

19. An acoustic assembly according to claim 18, comprising three equi-spaced apertures in the flange.

* * * * *